July 23, 1940.   C. BREER   2,208,627
RAILWAY VEHICLE
Filed May 27, 1937
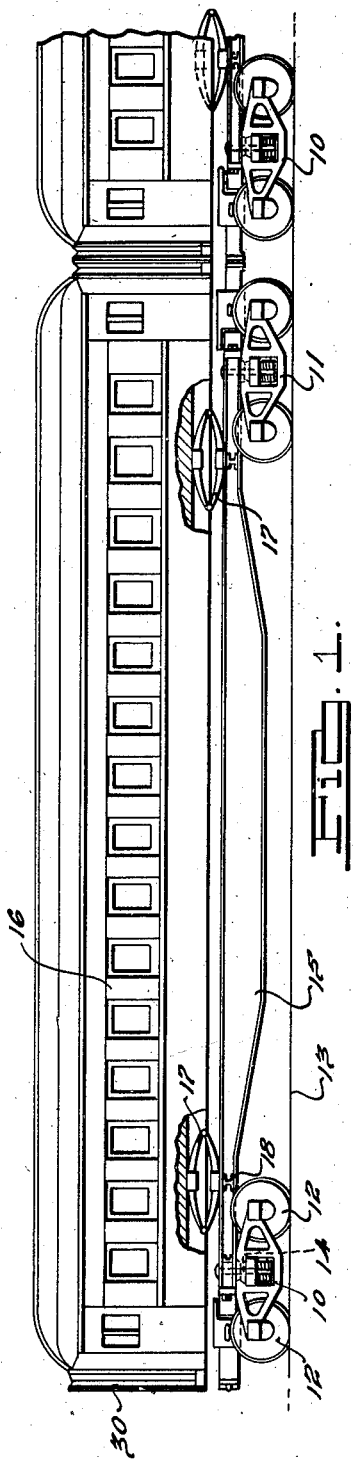
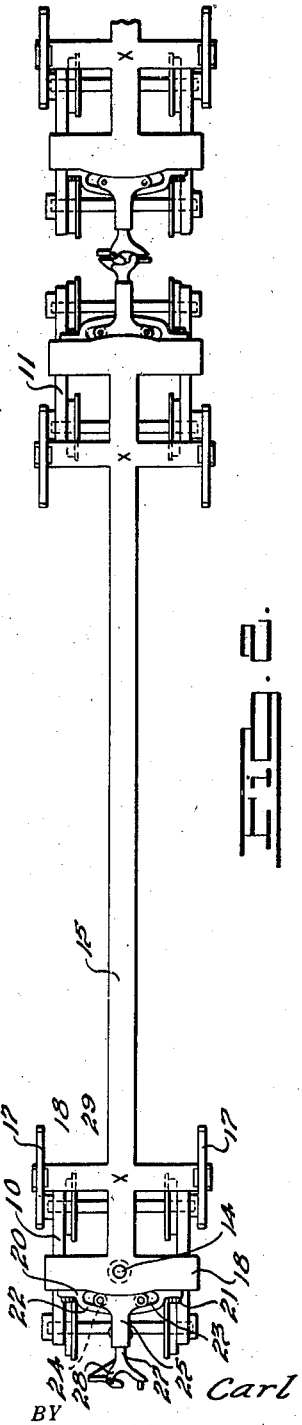
INVENTOR
Carl Breer.
BY
Harness, Lind, Patee & Harris
ATTORNEYS.

Patented July 23, 1940

2,208,627

UNITED STATES PATENT OFFICE 2,208,627

RAILWAY VEHICLE

Carl Breer, Grosse Pointe Park, Mich., assignor to Chrysler Corporation, Highland Park, Mich., a corporation of Delaware Application May 27, 1937, Serial No. 145,007

2 Claims. (Cl. 105—453)

My invention relates generally to vehicles and it has particular relation to various types of railway vehicles in which a series of cars are drawn or propelled over rails or tracks, and which may be employed for the hauling of either passengers or of merchandise.

One object of my invention consists in providing a railway vehicle in which all forces passing through each car to the remainder of the cars are confined to a chassis frame thereof, leaving the car body free to move with respect thereto at all times regardless of the stresses and strains to which the various parts of the train may be subjected.

Another object of my invention consists in providing a novel type of railway car construction in which the car body is mounted on a chassis frame at points so arranged as to subject the body to a minimum amount of shock and disturbance due to irregularities in the road bed and rails and which permits of operating the cars at higher speeds with less danger of derailment.

For a better understanding of my invention reference may now be had to the accompanying drawing, in which:

Fig. 1 is a side elevational view with portions thereof broken away for the sake of clarity, of one complete railway vehicle and a portion of a second vehicle constructed in accordance with my invention.

Fig. 2 is a plan view of the chassis frames and supporting mechanism of the structure illustrated in Fig. 1.

Referring particularly to the construction illustrated in Figs. 1 and 2, each vehicle comprises a pair of spaced supporting trucks 10 and 11, each of which has the ordinary flanged wheels 12 adapted to roll on the usual railroad rails 13. Each truck is provided with a king pin or center bearing 14 of the usual type on which is pivotally mounted a relatively rigid chassis frame 15, extending substantially the length of the vehicle. A car body 16, in this instance a passenger car, is mounted on four elliptical leaf springs 17 mounted near the ends of the car and adjacent the sides thereof, the springs being supported upon a cross member 18 constituting a portion of the chassis frame 15. On each end of the chassis frame 15 is secured a coupling member 20 which is rigidly attached thereto by bolts 21, or other suitable securing means. The coupling member 20 is of the type better shown in my co-pending application, Serial No. 118,814, filed January 2, 1937, and consists primarily of a housing or support 22, rigidly secured to the chassis frame 15, and provided with an arcuate slot or recess 23 within which is adapted to roll two roller members 24 on which is a supporting structure 25, which houses a resilient draft gear of the usual type, not shown, and to which is secured a draw bar 27 carrying a coupling member 28. The coupling member is of the rigid type so that when properly coupled to the corresponding coupling member of an adjacent car the draw bars and coupling members of the two adjacent cars become a rigid non-bendable structure.

The arcs representing the boundaries of the recess 23 are in this instance drawn about a point 29 disposed on a centerline of the chassis frame midway between the centers of the two springs 17, thus constituting a suspension center of the two spaced leaf springs. With this arrangement the rollers 24 may roll within the arcuate slot 23 in response to any lateral forces exerted thereon such, for example, as when a train rounds a curve in the track, but any forces transmitted thereby will have an effective point of application on the chassis frame at the center of the arc, marked 29.

Adjacent car bodies are each provided with the usual collapsible bellows type interconnecting mechanism 30, so that passengers may pass from one connecting coach to the next adjacent coach without being exposed to the weather and without danger of injury. It is preferable, in my construction, that these bellows mechanisms 30 be of such a nature that they cannot transmit any lateral or vertical forces from one car body to the next adjacent car body. It is also desirable that the car bodies terminate slightly short of the ends of the couplings 28 so that under no circumstances can the end of one car body engage the end of the next adjacent car body, which always results in the transmission of lateral forces from one car body to the other, particularly when a train is going around a curve in the tracks.

It will be observed from this construction that the only supporting connection between the car body and the chassis frame are the springs 17, although buffers may be additionally provided to prevent excessive lateral displacement of the car bodies with respect to the chassis frame in the event of unusual conditions. These buffers, if used, are normally out of engagement with the car bodies and do not affect the normal movement of the car bodies and are therefore not illustrated in the drawing.

As the load carried by the trucks is supported about the center bearings 14, those center bearings constitute the centers of suspension of the chassis frame. In like manner, points midway between the centers of springs 17 constitute the centers of suspension of the car body. It will be noted that the car body centers of suspension are within or between those of the chassis frame. I have found that by locating the centers of suspension of the car body at certain predetermined points the riding qualities of the car are materially improved. These points, for ideal conditions, I have found to be located in the vertical transverse plane of the center of percussion of the car body with respect to an axis of rotation disposed in the vertical transverse plane of the center of suspension of the opposite end of the coach. When this condition is fulfilled, any lateral forces, either horizontal or vertical, transmitted to the car body from the chassis frame causes the end of the body receiving the shock to move about a point within the vertical transverse plane of the center of suspension of the opposite end of the car as a center so that no shifting of the body with respect to the set of springs at the opposite end of the car body occurs, and, as result, the springs at the opposite end of the car body are not compressed, and no secondary spring reaction occurs.

If the aforementioned condition is not fulfilled, a displacement of the opposite end of the body with respect to its center of suspension always occurs, causing a shock or vibration in the opposite end of the car which the suspension means there located immediately tries to rectify, causing a lateral or vertical shift of the body with respect to its center of suspension which may require several cycles of movement to eliminate, and which, in turn, cause a secondary displacement of a smaller order to be reflected back to the end of the car receiving the original shock. On the other hand, if both centers of suspension substantially coincide with the centers of percussion no such transmission of shocks from end to end of the car body can occur and the riding quality of the car is materially improved.

In some instances I have found it desirable to so design the cars that the center of percussion with respect to the center of suspension at the opposite end of the car as an axis of rotation falls at a point beyond, or closer to the end of the coach than, the location of the center of suspension of the second set of springs. This is desirable where it is impossible to determine what the loading of the car will be so that, when the car is fully loaded, or normally loaded, in the case of passenger cars, the center of percussion will move toward the center of the car so as to coincide with the center of suspension. It is, of course, quite frequently impossible to have the centers of percussion fall on the exact center of suspension because each car is differently loaded at various times, but a commercial variation therefrom will still provide a vast improvement over the riding qualities of the present day equipment.

In addition, it will be noted that the trucks are disposed at the extreme ends of the cars. The advantage of this arrangement is that the side thrust on the flanges of the wheels on the rails in rounding a curve in the tracks is reduced to a minimum because the leverage thereof is equal in length to the distance between the centers of suspension of the chassis frame and at its maximum value, thus enabling the car to remain on the tracks at speeds considerably in excess of those which would cause derailment in the event that the trucks were closer to the center of the chassis frame and at the same time desirable riding qualities of the car body are insured by the fact that its centers of suspension are properly located with respect to its centers of percussion.

In addition, the centers of the arcuate coupling may be disposed at any desired point, for example, in the vertical plane of percussion of the chassis frame with respect to an axis of rotation in the vertical plane of the center of suspension at the opposite end thereof, or, if desired, it may be in the vertical plane of the center of percussion of the body and chassis combined with respect to an axis of rotation in the vertical plane of the center of suspension of the chassis at the opposite end of the chassis frame. Under ordinary circumstances, however, it is believed that it is preferable to have the center of the arc of the coupling mechanism at the center of suspension of the car body, thus reducing, to a minimum, the effect of any lateral or vertical forces transmitted to the car body thereby.

In the construction described it will be noted that all tension and compression forces exerted on the train, or being transmitted through one car to adjacent cars, are exerted on the chassis frame and none of them is exerted on the car body, and it is otherwise free to move on its suspension means entirely freely and independently of the other car bodies. This is particularly efficacious in eliminating disturbing forces when the train is entering a curve at which time its overall length is decreased or when emerging therefrom at which time its overall length is increased resulting in the generation of considerable forces between the cars. In addition, it will be apparent that the various collapsible bellows between cars will not be necessary where freight cars are employed.

Although I have illustrated and described in detail one form of my invention, it will be apparent to those skilled in the art that it is not so limited but that various modifications and changes may be incorporated therein without departing from the spirit of my invention or from the scope of the appended claims.

What I claim is:

1. In combination, a railway vehicle comprising a chassis frame provided with sets of supporting wheels adjacent each end thereof, means yieldingly supporting said chassis frame on said sets of wheels, coupling means associated with the ends of said chassis frame for detachably securing said frame to adjacent vehicles, a self-contained body member mounted on said frame only and movable in all directions with respect thereto, and means for interconnecting the ends of said body to the ends of bodies of adjacent vehicles independently of said chassis frame.

2. In combination, a railway vehicle comprising a chassis frame provided with supporting trucks adjacent each end thereof, means resiliently supporting said chassis frame on said trucks, coupling means associated with the ends of said chassis frame for detachably securing said frame to the frames of adjacently disposed vehicles, a car body supported on said frame only and resiliently movable with respect thereto in all directions within predetermined limits, and means associated with the ends of said body adapted to be secured to cooperating means on the bodies of adjacent vehicles to establish communication therebetween independently of said chassis frame.

CARL BREER.